(12) United States Patent
Kawashima et al.

(10) Patent No.: US 7,670,987 B2
(45) Date of Patent: Mar. 2, 2010

(54) REFORMING CATALYST FOR HYDROCARBON, METHOD FOR PRODUCING HYDROGEN USING SUCH REFORMING CATALYST, AND FUEL CELL SYSTEM

(75) Inventors: Yoshimi Kawashima, Sodegaura (JP); Hiroshi Ohashi, Sodegaura (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 498 days.

(21) Appl. No.: 10/589,987

(22) PCT Filed: Feb. 17, 2005

(86) PCT No.: PCT/JP2005/002432

§ 371 (c)(1),
(2), (4) Date: Aug. 18, 2006

(87) PCT Pub. No.: WO2005/079978

PCT Pub. Date: Sep. 1, 2005

(65) Prior Publication Data

US 2007/0172416 A1    Jul. 26, 2007

(30) Foreign Application Priority Data

Feb. 19, 2004    (JP)    ............................. 2004-043545

(51) Int. Cl.
| | |
|---|---|
| B01J 23/00 | (2006.01) |
| B01J 23/10 | (2006.01) |
| B01J 23/32 | (2006.01) |
| B01J 23/56 | (2006.01) |
| B01J 23/44 | (2006.01) |
| B01J 23/42 | (2006.01) |
| C01B 3/26 | (2006.01) |
| C01B 3/12 | (2006.01) |
| H01M 8/04 | (2006.01) |
| H01M 8/18 | (2006.01) |

(52) U.S. Cl. .................. 502/324; 502/302; 502/303; 502/304; 502/325; 502/332; 502/333; 502/334; 502/355; 423/651; 423/652; 423/655; 429/17; 429/19

(58) Field of Classification Search ......... 502/302–304, 502/349, 324, 355, 325, 332–334; 423/651, 423/652, 655; 429/17, 19
See application file for complete search history.

(56) References Cited

U.S. PATENT DOCUMENTS 4,299,734 A * 11/1981 Fujitani et al. .............. 502/304

(Continued)

FOREIGN PATENT DOCUMENTS

GB    1032755    6/1966

(Continued)

OTHER PUBLICATIONS

Jang et al. "Catalytic oxidation of methane over hexaaluminates and hexaaluminate-supported Pd catalysts," Catalysis Today 47 (1999) 103-113.*

(Continued)

Primary Examiner—Steven Bos
Assistant Examiner—Anthony J Zimmer
(74) Attorney, Agent, or Firm—Oblon, Spivak, McClelland, Maier & Neustadt, L.L.P.

(57) ABSTRACT

A hydrocarbon reforming catalyst which maintains carrier strength even after a long-term thermal history and which exhibits high catalytic activity is prepared by causing at least one noble metal component selected from among a ruthenium component, a platinum component, a rhodium component, a palladium component, and an iridium component to be supported on a carrier containing manganese oxide, alumina, and at least one compound selected from among lanthanum oxide, cerium oxide, and zirconium oxide, or a carrier containing silicon oxide, manganese oxide, and alumina. By use of the reforming catalyst, hydrogen is produced through steam reforming (1), autothermal reforming (2), partial-oxidation reforming (3), or carbon dioxide reforming (4). A fuel cell system is constituted from a reformer employing the reforming catalyst, and a fuel cell employing, as a fuel, hydrogen produced by the reformer.

9 Claims, 1 Drawing Sheet

U.S. PATENT DOCUMENTS

| | | | |
|---|---|---|---|
| 5,895,636 A | 4/1999 | Nguyen et al. | |
| 6,046,128 A | 4/2000 | Kisen et al. | |
| 6,107,239 A * | 8/2000 | Qin et al. | 502/300 |
| 7,459,224 B1 * | 12/2008 | Petch et al. | 429/17 |
| 2001/0026782 A1 | 10/2001 | Wang et al. | |

FOREIGN PATENT DOCUMENTS

| | | |
|---|---|---|
| JP | 06 015172 | 1/1994 |
| JP | 2001 322803 | 11/2001 |
| JP | 2002 282689 | 10/2002 |
| JP | 2003 320253 | 11/2003 |
| JP | 2003 320254 | 11/2003 |
| JP | 2004 113923 | 4/2004 |
| JP | 2004 209408 | 7/2004 |
| WO | WO 2004022224 A1 * | 3/2004 |

OTHER PUBLICATIONS

Sekizawa et al. "Catalytic properties of Pd-Supported Hexaaluminate Catalysts for High-Temperature Catalytic Combustion," Journal of Catalysis 142, 655-663 (1993).*

* cited by examiner

REFORMING CATALYST FOR HYDROCARBON, METHOD FOR PRODUCING HYDROGEN USING SUCH REFORMING CATALYST, AND FUEL CELL SYSTEM

TECHNICAL FIELD

The present invention relates to a catalyst for use in reforming of hydrocarbon (hereinafter referred to as a hydrocarbon reforming catalyst), to a method for producing hydrogen by use of the reforming catalyst, and to a fuel cell system. More particularly, the invention relates to a hydrocarbon reforming catalyst comprising a carrier containing at least one compound selected from among lanthanum oxide, cerium oxide, and zirconium oxide; manganese oxide; and alumina, or a carrier containing silicon oxide, manganese oxide, and alumina, and, supported on the carrier, at least one noble metal component selected from among a ruthenium component, a platinum component, a rhodium component, a palladium component, and an iridium component, the catalyst exhibiting enhanced catalytic activity, durability (compressive strength), and heat resistance (prevention of decrease in surface area and strength); to a method for producing hydrogen by use of the reforming catalyst; and to a fuel cell system employing the reforming catalyst.

BACKGROUND ART

In recent years, new energy-production techniques have attracted attention from the standpoint of environmental issues, and among these techniques a fuel cell has attracted particular interest. The fuel cell converts chemical energy to electric energy through electrochemical reaction of hydrogen and oxygen, attaining high energy utilization efficiency. Therefore, extensive studies have been carried out on realization of fuel cells for public use, industrial use, automobile use, etc.

Fuel cells are categorized in accordance with the type of employed electrolyte, and, among others, a phosphoric acid type, a molten carbonate salt type, a solid oxide type, and a polymer electrolyte type have been known. With regard to hydrogen sources, studies have been conducted on methanol; liquefied natural gas predominantly containing methane; city gas predominantly containing natural gas; a synthetic liquid fuel produced from natural gas serving as a feedstock; and petroleum-derived hydrocarbons such as naphtha and kerosene.

When hydrogen is produced from petroleum-derived hydrocarbons, the hydrocarbons are generally steam-reformed in the presence of a catalyst. Among such catalysts, catalysts that contain ruthenium supported on a carrier as an active component have conventionally been studied, in view of their advantages; e.g., comparatively high activity and suppression of carbon deposition even under low steam/carbon ratio operational conditions. In recent years, these ruthenium catalysts have been envisaged for use in fuel cells, which require a long-life catalyst.

Since the discovery of a co-catalyst effect of cerium oxide or zirconium oxide exerted on a ruthenium catalyst, ruthenium-cerium oxide-based and ruthenium-zirconium oxide-based catalysts have been studied and some patent applications have been filed. In addition to ruthenium-based catalysts, catalysts based on a platinum component, a rhodium component, a palladium component, an iridium component, or a nickel component have been studied. However, these catalysts have drawbacks, in that catalytic activity in terms of steam reforming of hydrocarbons remains unsatisfactory, and that carbon is deposited in a large amount during reforming.

In addition to the aforementioned steam reforming, other reforming processes for producing hydrogen, such as autothermal reforming, partial-oxidation reforming, and carbon dioxide reforming have been studied. As is known, all the above reforming processes can generally be performed through employment of the same reforming catalyst, and with slight modification of reforming conditions, all the above processes can also produce synthesis gas. Studies have also been carried out on use of components such as a ruthenium component, a platinum component, a rhodium component, a palladium component, an iridium component, and a nickel component in catalysts for the above autothermal reforming, partial-oxidation reforming, and carbon dioxide reforming. However, catalytic activity of the catalyst employing the elements remains unsatisfactory.

There have been proposed an enhanced-activity hydrocarbon reforming catalyst comprising a carrier containing manganese oxide and, supported on the carrier, at least one component selected from among a ruthenium component, a platinum component, a rhodium component, a palladium component, an iridium component, and a nickel component; a method for producing the reforming catalyst; and methods of the steam reforming, autothermal reforming, partial-oxidation reforming, and carbon dioxide reforming of hydrocarbon by use of the reforming catalyst (Patent Document 1).

There have been proposed a hydrocarbon reforming catalyst which is produced by preparing a catalyst comprising a carrier containing manganese oxide and, supported on the carrier, at least one component selected from among a ruthenium component, a platinum component, a rhodium component, a palladium component, an iridium component, and a nickel component, by use of at least one chlorine-containing compound; decomposing the compound with an aqueous alkaline solution, and removing chlorine atoms through washing with water; a method for producing the catalyst; and a hydrocarbon reforming method employing the reforming catalyst (Patent Document 2). However, the above disclosed reforming catalysts, exhibiting high activity in terms of reforming reaction, have problematically poor durability; i.e., poor strength, particularly compressive strength.

Patent Document 1

Pamphlet of International Patent Application No. 02/078840

Patent Document 2

Japanese Patent Application Laid-Open (kokai) No. 2003-265963

DISCLOSURE OF THE INVENTION

The present invention has been conceived under such circumstances, and an object of the present invention is to provide a hydrocarbon reforming catalyst which maintains carrier strength (particularly, compressive strength of the carrier) and heat resistance even after a long-term thermal history, which exhibits high catalytic activity, and which maintains the catalytic activity even after a long-term thermal history. Another object is to provide a hydrocarbon reforming catalyst which exhibits enhanced heat resistance (i.e., prevention of decrease in surface area and strength). Still another object is to provide a method for producing hydrogen by use of any of the reforming catalysts.

Yet another object of the invention is to provide an advanced fuel cell system comprising a reformer employing such an excellent reforming catalyst, and a fuel cell employing, as a fuel, hydrogen produced by the reformer.

The present inventors have carried out extensive studies in an effort to attain the aforementioned objects, and have found that through use of a carrier containing manganese oxide and alumina and, as an additive, at least one compound selected from among lanthanum oxide, cerium oxide, and zirconium oxide, surface diffusion of alumina and α phase nucleation are prevented, thereby maintaining strength of the carrier even after a long-term thermal history, and a ruthenium component, a platinum component, a rhodium component, a palladium component, or an iridium component is supported on the carrier in a highly dispersed state, whereby activity of the produced reforming catalyst increases and is maintained after a long-term thermal history. The inventors have also found that through use of a carrier containing manganese oxide and alumina and, as an additive, silicon oxide, a reforming catalyst in which a ruthenium component, a platinum component, a rhodium component, a palladium component, or an iridium component is supported on the carrier exhibits enhanced heat resistance. The present invention has been accomplished on the basis of these findings.

The present invention is directed to the following.

(1) A hydrocarbon reforming catalyst comprising a carrier containing at least one compound (a) selected from among lanthanum oxide, cerium oxide, and zirconium oxide, manganese oxide (b), and alumina (c), and, supported on the carrier, at least one noble metal component (d) selected from among a ruthenium component, a platinum component, a rhodium component, a palladium component, and an iridium component.

(2) The hydrocarbon reforming catalyst as described in (1) above, wherein the carrier is produced by impregnating an alumina (c) with at least one compound (a') selected from among a lanthanum compound, a cerium compound, and a zirconium compound, and a manganese compound (b'), and calcining the impregnated alumina carrier.

(3) The hydrocarbon reforming catalyst as described in (2) above, which is produced through calcining at 800 to 1,000° C.

(4) The hydrocarbon reforming catalyst as described in (1) above, wherein the carrier is produced by impregnating alumina (c) with at least one compound (a') selected from among a lanthanum compound, a cerium compound, and a zirconium compound; calcining the impregnated alumina carrier at 400 to 600° C.; impregnating the calcined carrier with a manganese compound (b'); and calcining the thus-impregnated carrier at 800 to 1,000° C.

(5). The hydrocarbon reforming catalyst as described in (1) above, wherein the amount of at least one compound selected from among lanthanum oxide, cerium oxide, and zirconium oxide is 1 to 20 mass % with respect to that of the reforming catalyst.

(6). A hydrocarbon reforming catalyst comprising a carrier containing silicon oxide (f), manganese oxide (b), and alumina (c), and, supported on the carrier, at least one noble metal component (d) selected from among a ruthenium component, a platinum component, a rhodium component, a palladium component, and an iridium component.

(7). The hydrocarbon reforming catalyst as described in (6) above, wherein the carrier is produced by impregnating alumina (c) with a silicon compound (f') and calcining the impregnated alumina, and, subsequently, impregnating the calcined alumina with a manganese compound (b') and calcining the thus-impregnated alumina.

(8). The hydrocarbon reforming catalyst as described in (6) above, wherein the carrier is produced by impregnating alumina (c) with a manganese compound (b') and calcining the impregnated alumina, and, subsequently impregnating the calcined alumina with a silicon compound (f') and calcining the thus-impregnated alumina.

(9). The hydrocarbon reforming catalyst as described in (6) above, wherein the carrier is produced by mixing a manganese compound (b') and a silicon compound (f'), impregnating alumina (c) simultaneously with the compounds, and calcining the impregnated alumina.

(10). The hydrocarbon reforming catalyst as described in any one of (6) to (9) above, wherein the silicon compound (f') is tetraethoxysilane.

(11). The hydrocarbon reforming catalyst as described in any one of (6) to (10) above, which has a silicon oxide (f) content of 1 to 20 mass %.

(12). The hydrocarbon reforming catalyst as described in any one of (1) to (11) above, wherein the manganese compound (b') is manganese acetate.

(13). The hydrocarbon reforming catalyst as described in (1) or (6) above, wherein said at least one noble metal component selected from among a ruthenium component, a platinum component, a rhodium component, a palladium component, and an iridium component is contained in the reforming catalyst in an amount of 0.1 to 8 mass % as reduced to noble metal element(s).

(14). The hydrocarbon reforming catalyst as described in (1) or (6) above, wherein the manganese oxide (b) is contained in the reforming catalyst in an amount of 3 to 20 mass %.

(15). The hydrocarbon reforming catalyst as described in any one of (1) to (14) above, which further contains at least one species selected from an alkali metal component and an alkaline earth metal component.

(16). A method for producing hydrogen, characterized by comprising reforming of hydrocarbon by use of a reforming catalyst as recited in any one of (1) to (15).

(17). The method for producing hydrogen as described in (16) above, wherein the reforming is steam reforming, autothermal reforming, partial-oxidation reforming, or carbon dioxide reforming.

(18). A fuel cell system, characterized by comprising a reformer employing a reforming catalyst as recited in any one of (1) to (15) above, and a fuel cell employing, as a fuel, hydrogen produced by the reformer.

According to the present invention, there can be provided a hydrocarbon reforming catalyst which maintains carrier strength (particularly, compressive strength of the carrier) even after a long-term thermal history, which exhibits high catalytic activity, and which maintains the catalytic activity even after a long-term thermal history; a hydrocarbon reforming catalyst which exhibits enhanced heat resistance; and a method for producing hydrogen by use of any of the reforming catalysts. The invention can also provide an advanced fuel cell system comprising a reformer employing such an excellent reforming catalyst, and a fuel cell employing, as a fuel, hydrogen produced by the reformer.

DESCRIPTION OF THE REFERENCE NUMERALS

Figure 1:
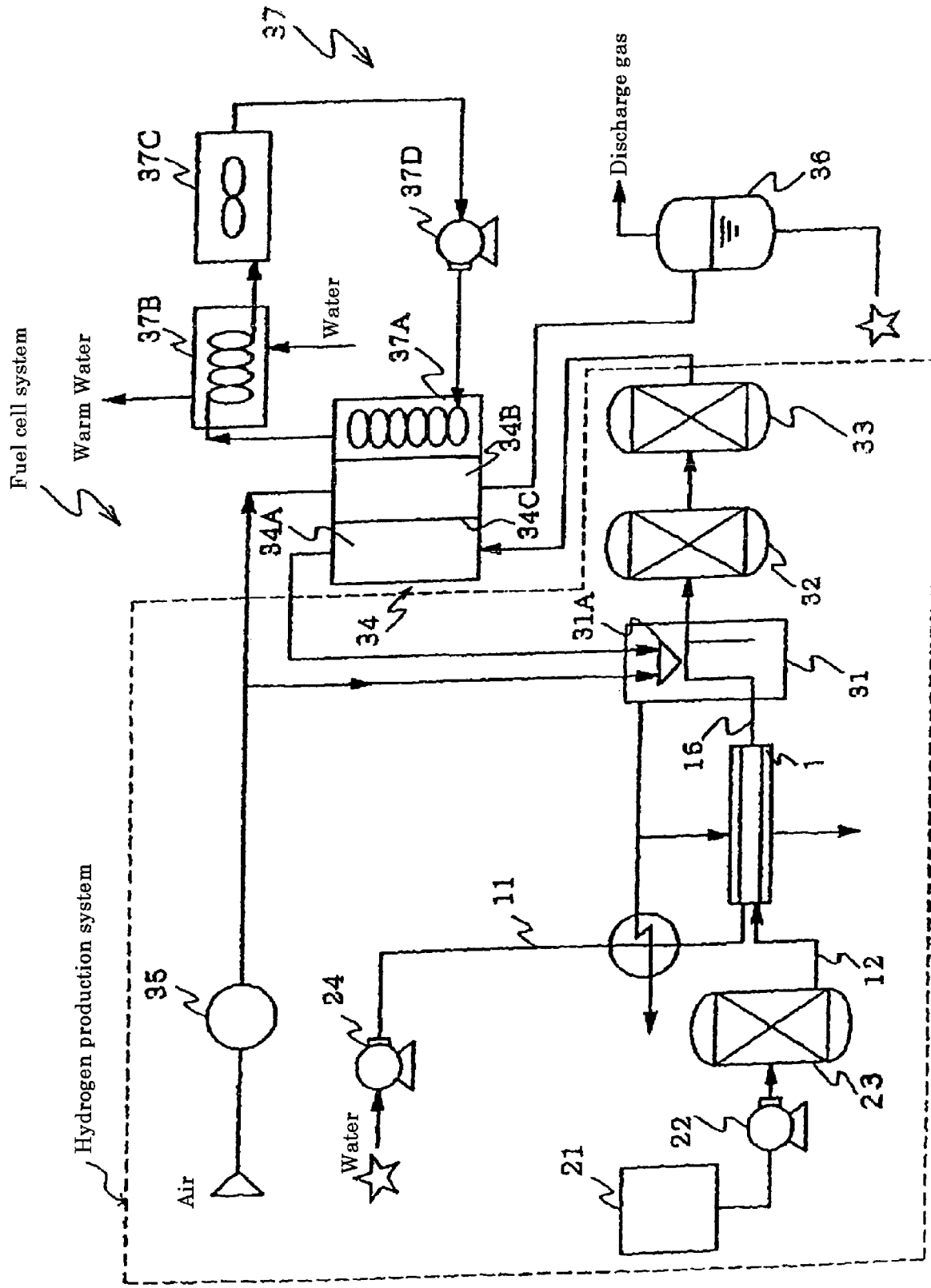
FIG. 1 is a schematic configuration of an embodiment of the fuel cell system of the present invention.

1: Vaporizer
11: Water-feeding pipe
12: Fuel conduit
15: Connecting pipe
21: Fuel tank
22: Fuel pump
23: Desulfurizer
24: Water pump
31: Reformer
31A: Burner of reformer
32: Shift reactor of carbon monoxide
33: Preferential oxidation reactor of carbon monoxide
34: Fuel cell
34A: Fuel cell negative electrode
34B: Fuel cell positive electrode
34C: Fuel cell polymer electrolyte
35: Air blower
36: Gas-water separator
37: Exhaust heat recovery unit
37A: Heat exchanger
37B: Heat exchanger
37C: Cooling unit
37D: Cooling medium circulation pump

BEST MODE FOR CARRYING OUT THE INVENTION

The present invention will next be described in detail.

The hydrocarbon reforming catalyst of the present invention includes a carrier containing at least one compound (a) selected from among lanthanum oxide, cerium oxide, and zirconium oxide, manganese oxide (b), and alumina (c), and, supported on the carrier, at least one noble metal component (d) selected from among a ruthenium component, a platinum component, a rhodium component, a palladium component, and an iridium component. Alternatively, the hydrocarbon reforming catalyst of the present invention includes a carrier containing silicon oxide (f), manganese oxide (b), and alumina (c), and, supported on the carrier, at least one noble metal component (d) selected from among a ruthenium component, a platinum component, a rhodium component, a palladium component, and an iridium component.

The above reforming catalyst and the production method therefor will next be described.

The method for producing a reforming catalyst including preparing a carrier containing at least one compound selected from among lanthanum oxide, cerium oxide, and zirconium oxide, manganese oxide, and alumina will now be described. One exemplary method is as follows.

(i) Specifically, at least one compound selected from among a lanthanum compound (e.g., lanthanum nitrate), a cerium compound (e.g., cerium nitrate), and a zirconium compound (e.g., zirconium nitrate) is dissolved in water, and alumina is impregnated with the solution. (ii) The thus-impregnated alumina is dried by means of a dryer at about 100 to 200° C. for about 1 to 10 hours, and calcined in a heating furnace at about 400 to 600° C., preferably about 500° C., for about 1 to 10 hours, preferably about 2 to 5 hours, whereby an alumina carrier containing at least one compound selected from among lanthanum oxide, cerium oxide, and zirconium oxide is prepared. (iii) Subsequently, a manganese compound (e.g., manganese acetate) is dissolved in water, and the alumina carrier containing at least one compound selected from among lanthanum oxide, cerium oxide, and zirconium oxide produced in (ii) above is impregnated with the solution. (iv) The thus-impregnated alumina carrier is dried by means of a dryer at about 100 to 200° C. for about 1 to 10 hours, and calcined in a heating furnace at about 800 to 1,000° C., preferably about 800° C., for about 1 to 10 hours, preferably about 2 to 5 hours, whereby a carrier containing at least one compound selected from among lanthanum oxide, cerium oxide, and zirconium oxide, manganese oxide, and alumina is prepared. (v) At least one noble metal component selected from among a ruthenium component, a platinum component, a rhodium component, a palladium component, and an iridium component is dissolved in water, and the carrier prepared in (iv) above is impregnated with the solution. (vi) Subsequently, the impregnation product is dried naturally or by means of a dryer such as a rotary evaporator or a blower dryer for about 30 to 180 minutes. (vii) Then, the catalyst precursor prepared in (vi) above is impregnated with an aqueous (about 1 to 10 mol/L) sodium hydroxide solution for several hours, to thereby decompose compounds supported on the carrier. (viii) Subsequently, the product of (vii) above is sufficiently washed with distilled water or the like and dried by means of, for example, a dryer at about 100 to 200° C. for about 1 to 10 hours, whereby a reforming catalyst of interest is produced.

Another embodiment of the production method is as follows. Specifically, (ix) a manganese compound (e.g., manganese acetate) is dissolved in water, and alumina is impregnated with the solution. (x) The impregnation product is dried by means of a dryer at about 100 to 200° C. for about 1 to 10 hours, and calcined in a heating furnace at about 800 to 1,000° C., preferably about 800° C., for about 1 to 10 hours, preferably about 2 to 5 hours, whereby an alumina carrier containing manganese oxide is prepared. (xi) Subsequently, at least one compound selected from among a lanthanum compound (e.g., lanthanum nitrate), a cerium compound (e.g., cerium nitrate), and a zirconium compound (e.g., zirconium nitrate) is dissolved in water. (xii) The manganese-oxide-containing aluminum carrier prepared in (x) above is impregnated with the solution. (xiii) Subsequently, the impregnation product is dried by means of a dryer at about 100 to 200° C. for about 1 to 10 hours, and calcined in a heating furnace at about 800 to 1,000° C., preferably about 800° C., for about 1 to 10 hours, preferably about 2 to 5 hours, whereby a carrier containing alumina, manganese oxide, and at least one compound selected from among lanthanum oxide, cerium oxide, and zirconium oxide is prepared.

(xiv) Subsequently, the steps as described in (v) to (viii) above are sequentially carried out, whereby a reforming catalyst of interest is produced.

Still another embodiment of the production method is as follows. Specifically, a manganese compound (e.g., manganese acetate) and at least one compound selected from among a lanthanum compound (e.g., lanthanum nitrate), a cerium compound (e.g., cerium nitrate), and a zirconium compound (e.g., zirconium nitrate) are dissolved in water, and alumina is impregnated with the solution. Subsequently, the impregnation product is dried by means of a dryer at about 100 to 200° C. for about 1 to 10 hours, and calcined in a heating furnace at about 800 to 1,000° C., preferably about 800° C., for about 1 to 10 hours, preferably about 2 to 5 hours, whereby a carrier containing alumina, manganese oxide, and at least one compound selected from among lanthanum oxide, cerium oxide, and zirconium oxide is prepared. Subsequently, the steps as described in (v) to (viii) above are sequentially carried out, whereby a reforming catalyst of interest is produced.

The method for producing a hydrocarbon reforming catalyst including a carrier containing silicon oxide, manganese oxide, and alumina and, supported on the carrier, at least one noble metal component selected from among a ruthenium component, a platinum component, a rhodium component, a palladium component, and an iridium component will now be described. One exemplary method is as follows. (A) Specifically, a silicon compound (e.g., tetraethoxysilane) is dissolved in ethanol, and alumina is immersed in the solution. The mixture is allowed to react at 30 to 80° C. for about 1 to 5 hours with stirring. (B) After completion of reaction, ethanol is evaporated, and the residue is dried by means of a dryer at about 100 to 200° C. for about 5 to 20 hours, and calcined in a heating furnace at about 800 to 1,000° C., preferably about 800° C., for about 1 to 10 hours, preferably about 3 to 5 hours, whereby an alumina carrier containing silicon oxide is prepared. (C) Subsequently, a manganese compound (e.g., manganese acetate) is dissolved in water, and the silicon-oxide-containing alumina carrier prepared in (A) above is impregnated with the solution. The impregnation product is dried by means of a dryer at about 100 to 200° C. for about 5 to 20 hours, and calcined in a heating furnace at about 800 to 1,000° C., preferably about 800° C., for about 1 to 10 hours, preferably about 3 to 5 hours, whereby an alumina carrier containing silicon oxide and manganese oxide is produced.

Another embodiment of the production method is as follows. (D) Firstly, a manganese compound (e.g., manganese acetate) is dissolved in water, and alumina is impregnated with water. The impregnation product is dried by means of a dryer at about 100 to 200° C. for about 5 to 20 hours. (E) Subsequently, a silicon compound (e.g., tetraethoxysilane) is dissolved in ethanol, and the impregnation product is immersed in the ethanol solution. The mixture is allowed to react at 30 to 80° C. for about 1 to 5 hours with stirring. (F) After completion of reaction, ethanol is evaporated, and the residue is dried by means of a dryer at about 100 to 200° C. for about 5 to 20 hours, and calcined in a heating furnace at about 800 to 1,000° C., preferably about 800° C., for about 1 to 10 hours, preferably about 3 to 5 hours, whereby an alumina carrier containing silicon oxide and manganese oxide is prepared.

In still another embodiment, a silicon compound (e.g., tetraethoxysilane) dissolved in ethanol and a manganese compound (e.g., manganese acetate) dissolved in water are provided, and two solutions are mixed with stirring. Alumina is impregnated with the solution mixture. The impregnation product is dried by means of a dryer at about 100 to 200° C. for about 5 to 20 hours, and calcined in a heating furnace at about 800 to 1,000° C., preferably about 800° C., for about 1 to 10 hours, preferably about 3 to 5 hours, whereby an alumina carrier containing silicon oxide and manganese oxide is prepared.

The thus-produced alumina carrier containing silicon oxide and manganese oxide is impregnated with an aqueous solution containing at least one noble metal component selected from among a ruthenium component, a platinum component, a rhodium component, a palladium component, and an iridium component. The impregnation product is dried naturally or by means of a dryer such as a rotary evaporator or a blower dryer for about 30 to 180 minutes. Then, the dried product is impregnated with an aqueous (about 1 to 10 mol/L) sodium hydroxide solution for several hours, to thereby decompose compounds supported on the carrier. Subsequently, the product is sufficiently washed with distilled water or the like, and water is removed through filtration or a similar means, followed by drying by means of, for example, a dryer at about 100 to 200° C. for about 1 to 10 hours, whereby a reforming catalyst of interest is produced.

In the present invention, manganese oxides having a variety of valences may be employed, and specific examples include $MnO$, $Mn_3O_4$, $Mn_2O_3$, $MnO_2$, $MnO_3$, and $Mn_2O_7$. Of these, tetravalent manganese dioxide ($MnO_2$) is preferred from the viewpoint of availability and stability. A commercial manganese dioxide ($MnO_2$) product may be employed, and manganese dioxide ($MnO_2$) produced through calcining a manganese compound such as manganese acetate [$Mn(CH_3COO)_2 \cdot 4H_2O$], manganese sulfate [$MnSO_4 \cdot 5H_2O$], manganese nitrate [$Mn(NO_3)_2 \cdot 6H_2O$], or manganese chloride [$MnCl_2 \cdot 4H_2O$] may also be employed.

The manganese oxide content is preferably 3 to 20 mass % based on the reforming catalyst, more preferably 5 to 15 mass %.

The alumina species which forms the carrier may be commercial products having any crystal type; i.e., $\alpha$, $\beta$, $\gamma$, $\eta$, $\theta$, $\kappa$, or $\chi$. Of these, $\alpha$-alumina, alumina having an $\alpha$-alumina phase, and $\gamma$-alumina are preferred from the viewpoint of catalytic activity.

As the alumina species, alumina hydrate (e.g., boehmite, bialite, or gibbsite) calcined product may also be employed. Alternatively, there may be employed alumina produced by calcining aluminum hydroxide precipitates which have been formed by adding an alkaline buffer (pH: 8 to 10) to aluminum nitrate. A calcined product of aluminum chloride may also be used. Yet alternatively, alumina prepared through the solgel method may also be employed. Specifically, an alkoxide such as aluminum isopropoxide is dissolved in an alcohol such as 2-propanol, and alumina gel is prepared from the solution in the presence of inorganic acid (e.g., hydrochloric acid) serving as a hydrolysis catalyst. The gel is dried and calcined, to thereby form alumina.

Upon use of manganese oxide and alumina in combination, alumina and manganese oxide may be mixed for use. In an alternative manner, alumina is impregnated with an aqueous solution of a manganese compound such as manganese acetate [$Mn(CH_3COO)_2 \cdot 4H_2O$], manganese sulfate [$MnSO_4 \cdot 5H_2O$], manganese nitrate [$Mn(NO_3)_2 \cdot 6H_2O$], or manganese chloride [$MnCl_2 \cdot 4H_2O$], and the impregnation product is calcined.

The lanthanum compound employed in the present invention is preferably highly water-soluble. Examples of such compounds include lanthanum chloride ($LaCl_3$, $LaCl_3 \cdot 7H_2O$), lanthanum bromide ($LaBr_3$), lanthanum iodide ($LaI_3$), lanthanum nitrate [$La(NO_3)_3 \cdot 6H_2O$], and lanthanum acetate [$La(CH_3COO)_3 \cdot 1.5H_2O$].

Cerium compounds are present in a valence state of three or four. In the present invention, a trivalent cerium compound is preferably used from the viewpoint of stability. Examples of such compounds include cerium chloride ($CeCl_3$), cerium bromide ($CeBr_3$), cerium iodide ($CeI_3$), cerium nitrate [$Ce(NO_3)_3 \cdot 6H_2O$], cerium carbonate [$Ce_2(CO_3)_3 \cdot 5H_2O$], and cerium sulfate [$Ce_2(SO_4)_3 \cdot nH_2O$].

Zirconium compounds are present in a valence state of two, three, or four. Examples of such compounds include zirconium chloride ($ZrCl_2$, $ZrCl_3$, $ZrCl_4$), zirconium bromide ($ZrBr_2$, $ZrBr_3$, $ZrBr_4$), zirconium iodide ($ZrI_2$, $ZrI_3$, $ZrI_4$), zirconium nitrate [$Zr(NO_3)_2 \cdot 2H_2O$], zirconia nitrate [ZrO $(NO_3)_2.H_2O]$, zirconium sulfate $[Zr(SO_4)_2, Zr(SO_4)_2.4H_2O]$, zirconium acetate $[Zr(CH_3CO_2)_4]$, and zirconia acetate $[ZrO(CH_3CO_2)_2]$.

The silicon compound employable in the present invention may be an organic silane compound, which is readily dissolved in organic solvent such as ethanol and which has high storage stability. Preferably, the silicon compound has no halogen atom such as a chlorine atom. Thus, tetraalkoxysilane is preferably employed. Examples of the tetraalkoxysilane include tetramethoxysilane, tetraethoxysilane, tetrapropoxysilane, and tetrabutoxysilane.

When alumina is impregnated with an aqueous solution of the aforementioned manganese compound, lanthanum compound, cerium compound, or zirconium compound for incorporating a catalyst component into the carrier, the amount of water for preparing the aqueous solution of each compound is preferably adjusted such that the dissolution water ratio falls within a range of 0.7 to 1.3.

The aforementioned dissolution water ratio is calculated according to the following formula (1):

Dissolution water ratio=volume of water employed (mL)/volume of dissolution water required (mL)     (1).

The volume of water employed includes not only water for preparing a solution but also water of crystallization contained in the manganese compound, lanthanum compound, cerium compound, or zirconium compound. The volume of dissolution water required refers to water absorption capacity of the alumina carrier, and is calculated according to the following formula (2):

Volume of dissolution water required (mL)=micropore volume of carrier (mL/g)×amount of carrier (g)     (2)

(wherein the miropore volume of the alumina carrier has been determined through mercury penetration method). The micropore volume of the aluminum carrier employed in the present invention (KHO-24, product of Sumitomo Chemical Co., Ltd.) was determined to be 0.42 mL/g.

When the carrier is impregnated with a manganese compound, a lanthanum compound, a cerium compound, or a zirconium compound in a divided manner, the dissolution water ratio is preferably adjusted to 0.7 to 1.3 in each impregnation operation.

Generally, the aforementioned alumina containing a manganese compound and at least one species selected from among a lanthanum compound, a cerium compound, and a zirconium compound, which has been supported thereon, is preferably calcined at 800 to 1,000° C. from the viewpoint of catalytic activity. The calcining atmosphere may be oxygen, air, or, depending on the type of the manganese compound, inert gas such as nitrogen or argon. The gas temperature is preferably 800 to 900° C. Specifically, either alumina serving as a carrier material or alumina containing a manganese compound and at least one species selected from among a lanthanum compound, a cerium compound, and a zirconium compound, which are supported thereon may be treated at high temperature (800 to 1,000° C.). Although both alumina species may be treated at high temperature, in an economically preferred mode, the alumina species on which a manganese compound and at least one species selected from among a lanthanum compound, a cerium compound, and a zirconium compound have been supported thereon is treated at high temperature. When the treatment temperature falls within a range of 800 to 1,000° C., catalytic activity can be enhanced, and deterioration of catalytic activity caused by sintering is prevented.

In the case where only at least one species selected from among a lanthanum compound, a cerium compound, and a zirconium compound is incorporated at first into alumina, calcination is performed at about 400 to 600° C., preferably about 500° C.

In the case where the alumina on which a manganese compound and a silicon compound have been supported is calcined, when the calcining temperature falls within a range of 800 to 1,000° C., catalytic activity can be enhanced, and deterioration of catalytic activity caused by sintering is prevented.

Subsequently, into the carrier containing at least one compound selected from among lanthanum oxide, cerium oxide, and zirconium oxide, manganese oxide, and alumina, or onto the carrier containing manganese oxide, silicon oxide, and alumina, at least one component (d) selected from a ruthenium component, a platinum component, a palladium component, and an iridium component is incorporated. If required, at least one component (e) selected from an alkali metal component and an alkaline earth metal component is further supported on the carriers.

In the above supporting operation, a solution containing component (d) or a solution containing components (d) and (e) is used. Although these components may be supported in separate steps, economically, they are preferred to be supported simultaneously.

Supporting may be performed through a variety of methods, for example, impregnation techniques such as heat impregnation, room temperature impregnation, vacuum impregnation, atmospheric pressure impregnation, impregnation-dryness method, and pore-filling method; immersion; light permeation method; wet adsorption method; spraying method; and coating method. Of these, impregnation techniques are preferred.

Similar to conventional cases, the above supporting operation may be appropriately carried out under atmospheric pressure or reduced pressure. No particular limitation is imposed on the operation temperature, and the operation may be performed at or near room temperature. If required, additional heating or moisturizing may be performed. For example, the operation may be appropriately performed at room temperature to about 150° C. The time for contact between the components and the carrier is one minute to 10 hours.

Examples of ruthenium compounds serving as a source of the ruthenium component include $RuCl_3.nH_2O$, $Ru(NO_3)_3$, $Ru_2(OH)_2Cl_4.7NH_3.3H_2O$, $K_2(RuCl_5(H_2O))$, $(NH_4)_2(RuCl_5(H_2O))$, $K_2(RuCl_5(NO))$, $RuBr_3.nH_2O$, $Na_2RuO_4$, $Ru(NO)(NO_3)_3$, $(Ru_3O(OAc)_6(H_2O)_3)OAc.nH_2O$, $K_4(Ru(CN)_6).nH_2O$, $K_2(Ru(NO_2)_4(OH)(NO))$, $(Ru(NH_3)_6)Cl_3$, $(Ru(NH_3)_6)Br_3$, $(Ru(NH_3)_6)Cl_2$, $(Ru(NH_3)_6)Br_2$, $(Ru_3O_2(NH_3)_{14})Cl_6.H_2O$, $(Ru(NO)(NH_3)_5)Cl_3$, $(Ru(OH)(NO)(NH_3)_4)(NO_3)_2$, $RuCl_2(PPh_3)_3$, $RuCl_2(PPh_3)_4$, $(RuClH(PPh_3)_3).C_7H_8$, $RuH_2(PPh_3)_4$, $RUClH(CO)(PPh_3)_3$, $RuH_2(CO)(PPh_3)_3$, $(RuCl_2(cod))_n$, $Ru(CO)_{12}$, $Ru(acac)_3$, $(Ru(HCOO)(CO)_2)_n$, and $Ru_2I_4(p\text{-cymene})_2$. These compounds may be used singly or in combination of two or more species. Of these, $RuCl_3.nH_2O$, $Ru(NO_3)_3$, and $Ru_2(OH)_2Cl_4.7NH_3.3H_2O$ are preferably used from the viewpoint of easiness in handling, with $RuCl_3.nH_2O$ being particularly preferred.

Examples of platinum compounds serving as a source of the platinum component include $PtCl_4$, $H_2PtCl_6$, $Pt(NH_3)_4Cl_2$, $(NH_4)_2PtCl_2$, $H_2PtBr_6$, $NH_4[Pt(C_2H_4)Cl_3]$, $Pt(NH_3)_4(OH)_2$, and $Pt(NH_3)_2(NO_2)_2$. These compounds may be used singly or in combination of two or more species.

Examples of rhodium compounds serving as a source of the rhodium component include $Na_3RhCl_6$, $(NH_4)_2RhCl_6$, Rh(NH$_3$)$_5$Cl$_3$, and RhCl$_3$. These compounds may be used singly or in combination of two or more species.

Examples of palladium compounds serving as a source of the palladium component include (NH$_4$)$_2$PdCl$_6$, (NH$_4$)$_2$PdCl$_4$, Pd(NH$_3$)$_4$Cl$_2$, PdCl$_2$, and Pd(NO$_3$)$_2$. These compounds may be used singly or in combination of two or more species.

Examples of iridium compounds serving as a source of the iridium component include (NH$_4$)$_2$IrCl$_6$, IrCl$_3$, and H$_2$IrCl$_6$. These compounds may be used singly or in combination of two or more species.

Examples of alkali metal components preferably employed in the invention include potassium, cesium, rubidium, sodium, and lithium.

Examples of compounds serving as a source of the alkali metal component include K salts such as K$_2$B$_{10}$O$_{16}$, KBr, KBrO$_3$, KCN, K$_2$CO$_3$, KCl, KClO$_3$, KClO$_4$, KF, KHCO$_3$, KHF$_2$, KH$_2$PO$_4$, KH$_5$(PO$_4$)$_2$, KHSO$_4$, KI, KIO$_3$, KIO$_4$, K$_4$I$_2$O$_9$, KN$_3$, KNO$_2$, KNO$_3$, KOH, KPF$_6$, K$_3$PO$_4$, KSCN, K$_2$SO$_3$, K$_2$SO$_4$, K$_2$S$_2$O$_3$, K$_2$S$_2$O$_5$, K$_2$S$_2$O$_6$, K$_2$S$_2$O$_8$, and K(CH$_3$COO); Cs salts such as CsCl, CsClO$_3$, CsClO$_4$, CsHCO$_3$, CsI, CsNO$_3$, Cs$_2$SO$_4$, Cs(CH$_3$COO), Cs$_2$CO$_3$, and CsF; Rb salts such as Rb$_2$B$_{10}$O$_{16}$, RbBr, RbBrO$_3$, RbCl, RbClO$_3$, RbClO$_4$, RbI, RbNO$_3$, Rb$_2$SO$_4$, Rb(CH$_3$COO), and Rb$_2$CO$_3$; Na salts such as Na$_2$B$_4$O$_7$, NaB$_{10}$O$_{16}$, NaBr, NaBrO$_3$, NaCN, Na$_2$CO$_3$, NaCl, NaClO, NaClO$_3$, NaClO$_4$, NaF, NaHCO$_3$, NaH$_2$PO$_3$, Na$_2$HPO$_3$, Na$_2$HPO$_4$, NaH$_2$PO$_4$, Na$_3$HP$_2$O$_6$, Na$_2$H$_2$P$_2$O$_7$, NaI, NaIO$_3$, NaIO$_4$, NaN$_3$, NaNO$_2$, NaNO$_3$, NaOH, Na$_2$PO$_3$, Na$_3$PO$_4$, Na$_4$P$_2$O$_7$, Na$_2$S, NaSCN, Na$_2$SO$_3$, Na$_2$SO$_4$, Na$_2$S$_2$O$_5$, Na$_2$S$_2$O$_6$, and Na(CH$_3$COO); and Li salts such as LiBO$_2$, Li$_2$B$_4$O$_7$, LiBr, LiBrO$_3$, Li$_2$CO$_3$, LiCl, LiClO$_3$, LiClO4, LiHCO$_3$, Li$_2$HPO$_3$, LiI, LiN$_3$, LiNH$_4$SO$_4$, LiNO$_2$, LiNO$_3$, LiOH, LiSCN, Li$_2$SO$_4$, and Li$_3$VO$_4$. These compounds may be used singly or in combination or two or more species.

Examples of alkaline earth metal components preferably employed in the invention include barium, calcium, magnesium, and strontium.

Examples of compounds serving as a source of the alkali metal component include Ba salts such as BaBr$_2$, Ba(BrO$_3$)$_2$, BaCl$_2$, Ba(ClO$_2$)$_2$, Ba(ClO$_3$)$_2$, Ba(ClO$_4$)$_2$, BaI$_2$, Ba(N$_3$)$_2$, Ba(NO$_2$)$_2$, Ba(NO$_3$)$_2$, Ba(OH)$_2$, BaS, BaS$_2$O$_6$, BaS$_4$O$_6$, and Ba(SO$_3$NH$_2$)$_2$; Ca salts such as CaBr$_2$, CaI$_2$, CaCl$_2$, Ca(ClO$_3$)$_2$, Ca(IO$_3$)$_2$, Ca(NO$_2$)$_2$, Ca(NO$_3$)$_2$, CaSO$_4$, CaS$_2$O$_3$, CaS$_2$O$_6$, Ca(SO$_3$NH$_2$)$_2$, Ca(CH$_3$COO)$_2$, and Ca(H$_2$PO$_4$)$_2$; Mg salts such as MgBr$_2$, MgCO$_3$, MgCl$_2$, Mg(ClO$_3$)$_2$, MgI$_2$, Mg(IO$_3$)$_2$, Mg(NO$_2$)$_2$, Mg(NO$_3$)$_2$, MgSO$_3$, MgSO$_4$, MgS$_2$O$_6$, Mg(CH$_3$COO)$_2$, Mg(OH)$_2$, and Mg(ClO$_4$)$_2$; and Sr salts such as SrBr$_2$, SrCl$_2$, SrI$_2$, Sr(NO$_3$)$_2$, SrO, SrS$_2$O$_3$, SrS$_2$O$_6$, SrS$_4$O$_6$, Sr(CH$_3$COO)$_2$, and Sr(OH)$_2$. These compounds may be used singly or in combination or two or more species.

The amount of the aforementioned component (d); i.e., at least one component selected from among a ruthenium component, a platinum component, a rhodium component, a palladium component, and an iridium component, supported on the carrier, is generally 0.1 to 8 mass %, as reduced to noble metal element(s) and based on the reforming catalyst, preferably 0.5 to 5 mass %.

The lanthanum oxide content, the cerium oxide content, or the zirconium oxide content of the reforming catalyst is preferably 1 to 20 mass %, more preferably 2.5 to 10 mass %.

The silicon oxide content is preferably 1 to 20 mass % based on the reforming catalyst, more preferably 2.5 to 10 mass %.

After completion of the above supporting operation, the catalyst is dried in accordance with needs. Examples of the drying method include natural drying and drying by use of a rotary evaporator or a blower dryer.

No particular limitation is imposed on the shape or size of the reforming catalyst prepared in the invention, and reforming catalysts in the form of powder, balls, particles, honeycomb structure, foam, fiber, cloth, plate, ring, etc., which are generally employed, may be selected.

After the thus-prepared catalyst has been charged into a reformer, the catalyst is subjected to reduction with hydrogen. The reduction treatment is performed through gas phase reduction in gas flow containing hydrogen, or through wet-format reduction by use of a reducing agent. The former gas phase reduction is generally performed in a gas flow containing hydrogen at 500 to 800° C., preferably 600 to 700° C., for 1 to 24 hours, preferably 3 to 12 hours.

Examples of the latter wet-format reduction include Birch reduction, which employs liquid ammonia/alcohol/Na or liquid ammonia/alcohol/Li; Benkeser reduction, which employs methylamine/Li or a similar system; and reduction methods employing a reducing agent such as Zn/HCl, Al/NaOH/H$_2$O, NaH, LiAlH$_4$ or a substituted compound, hydrosilanes, sodium borohydride or a substituted compound, diborane, formic acid, formalin, or hydrazines. In this case, reduction is generally carried out at room temperature to 100° C. for 10 minutes to 24 hours, preferably 30 minutes to 10 hours.

The method for reforming hydrocarbon by use of the reforming catalyst of the present invention will next be described.

Firstly, steam reforming reaction of hydrocarbon in the presence of the reforming catalyst of the present invention will be described.

Examples of hydrocarbon feedstocks employed in the steam reforming reaction include linear-chain or branched saturated aliphatic hydrocarbons having about 1 to 16 carbon atoms such as methane, ethane, propane, butane, pentane, hexane, heptane, octane, nonane, and decane; saturated alicyclic hydrocarbons such as cyclohexane, methylcyclohexane, and cyclooctane; monocyclic and polycyclic aromatic hydrocarbons; city gas, LPG, naphtha, and kerosene.

Generally, when such a hydrocarbon feedstock contains sulfur, the material is preferably desulfurized to a sulfur content of 0.1 ppm or less through a desulfurization step. When the sulfur content of the hydrocarbon feedstock is in excess of about 0.1 ppm, a steam reforming catalyst may be deactivated. No particular limitation is imposed on the desulfurization method, and any desulfurization method such as hydrogenation desulfurization or adsorption desulfurization may be appropriately employed. Needless to say, no particular limitation is imposed on the steam which is employed in steam reforming.

In determination of steam reforming reaction conditions, the amount of hydrocarbon and that of steam are controlled such that the steam/carbon (mol) ratio is generally regulated to 1.5 to 10, preferably 1.5 to 5, more preferably 2 to 4. Through control of the steam/carbon (mol) ratio, hydrogen gas can be yielded efficiently.

The reaction temperature is generally 200 to 900° C., preferably 250 to 900° C., more preferably 300 to 800° C. The reaction pressure is generally 0 to 3 MPa·G, preferably 0 to 1 MPa·G.

When a hydrocarbon having a boiling point equal to or higher than that of kerosene is employed as a feedstock, steam reforming is preferably performed while the inlet temperature of a steam reforming catalyst layer is maintained at 630° C. or lower; preferably 600° C. or lower. When the inlet temperature is higher than 630° C., pyrolysis of the hydrocarbon is promoted, to thereby form radicals, and carbon is deposited on the catalyst or the reactor tube wall, leading in some cases to difficulty in operation. No particular limitation is imposed on the outlet temperature of the catalyst layer, but the outlet temperature preferably falls within a range of 650 to 800° C. When the outlet temperature is lower than 650° C., the amount of formed hydrogen may be unsatisfactory, whereas when the temperature is higher than 800° C., the reactor may require heat resistant materials, hence economically unfavorable.

In the above case, a somewhat larger amount of steam is fed, and the reaction temperature and the reaction pressure are both somewhat low.

Secondary, autothermal reforming reaction, partial-oxidation reforming reaction, and carbon dioxide reforming reaction of hydrocarbon, by use of the reforming catalyst of the present invention, will be described.

In the autothermal reforming, oxidation of a hydrocarbon and reaction of a hydrocarbon with steam occur in the same reactor or continuously disposed reactors. In the production of hydrogen, the reaction temperature is generally 200 to 1,300° C., preferably 400 to 1,200° C., more preferably 500 to 900° C.; the steam/carbon (mol) ratio is generally 0.1 to 10, preferably 0.4 to 4; the oxygen/carbon (mol) ratio is generally 0.1 to 1, preferably 0.2 to 0.8; and the reaction pressure is generally 0 to 10 MPa·G, preferably 0 to 5 MPa·G, more preferably 0 to 3 MPa·G. Hydrocarbons similar to those employed in steam reforming are used in autothermal reforming.

In the partial-oxidation reforming, partial oxidation of a hydrocarbon occurs. In the production of hydrogen, the reaction temperature is generally 350 to 1,200° C., preferably 450 to 900° C.; the oxygen/carbon (mol) ratio is generally 0.4 to 0.8, preferably 0.45 to 0.65; and the reaction pressure is generally 0 to 30 MPa·G, preferably 0 to 5 MPa·G, more preferably 0 to 3 MPa·G. Hydrocarbons similar to those employed in steam reforming are used in partial-oxidation reforming.

In the carbon dioxide reforming, reaction of a hydrocarbon with carbon dioxide occurs. In the production of hydrogen, the reaction temperature is generally 200 to 1,300° C., preferably 400 to 1,200° C., more preferably 500 to 900° C.; the carbon dioxide/carbon (mol) ratio is generally 0.1 to 5, preferably 0.1 to 3; the steam/carbon (mol) ratio (when steam is fed) is generally 0.1 to 10, preferably 0.4 to 4; the oxygen/carbon (mol) ratio (when oxygen is fed) is generally 0.1 to 1, preferably 0.2 to 0.8; and the reaction pressure is generally 0 to 10 MPa·G, preferably 0 to 5 MPa·G, more preferably 0 to 3 MPa·G. Although methane is typically used as the hydrocarbon, other hydrocarbons similar to those employed in steam reforming are also used in carbon dioxide reforming.

The aforementioned reforming reactions may be performed in a continuous flow manner or in a batch manner, with a continuous flow manner being preferred. When the continuous flow manner is employed, liquid hourly space velocity (LHSV) of hydrocarbon is generally 0.1 to 10 hr$^{-1}$, preferably 0.25 to 5 hr$^{-1}$, whereas when hydrocarbon gas such as methane is employed, gas hourly space velocity (GHSV) of the gas is generally 200 to 100,000 hr$^{-1}$.

No particular limitation is imposed on the reaction type, and any of a fixed-bed type, a moving-bed type, and a fluidizing-bed type can be employed, with a fixed-bed type being preferred. No particular limitation is imposed on the reactor type, and reactors such as a tube reactor can be employed.

Through use of the reforming catalyst of the present invention under the aforementioned conditions, a hydrocarbon is subjected to steam reforming, autothermal reforming, partial-oxidation reforming, or carbon dioxide reforming, to thereby yield hydrogen. Such a reforming is suitably employed as a process for producing hydrogen for use in a fuel cell.

A characteristic feature of the fuel cell system of the present invention is that the fuel cell system includes a reformer employing the aforementioned reforming catalyst, and a fuel cell employing, as a fuel, hydrogen produced by the reformer. An embodiment of the fuel cell system will next be described with reference to FIG. 1.

A fuel placed in a fuel tank 21 is transferred to a desulfurizer 23 through a fuel pump 22. An adsorbent such as activated carbon, zeolite, or a metallic adsorbent may be charged into the desulfurizer 23. The fuel which has been desulfurized by means of the desulfurizer 23 intermingles with water fed from a water tank through a water pump 24, and the mixture is fed to a vaporizer 1, where the mixture is vaporized. Subsequently, the vapor is mixed with air fed through an air blower 35, and the gas stream is transferred to a reformer 31, where the aforementioned reforming catalyst is charged. Hydrogen is produced from the fuel mixture (gas mixture containing hydrocarbon, steam, and oxygen) which is transferred to reformer 31, according to any of the aforementioned reforming processes.

CO content of the thus-produced hydrogen is lowered, through a shift reactor of carbon monoxide 32 and a preferential oxidation reactor of carbon monoxide, to such a level that the characteristics of the fuel cell are not impaired. Examples of the catalyst employed in the shift reactor of carbon monoxide 32 include an iron-chromium catalyst, a copper-zinc catalyst, and a noble metal catalyst. Examples of the catalyst employed in the preferential oxidation reactor of carbon monoxide 33 include a ruthenium catalyst, a platinum catalyst, and a mixture thereof. In the case where hydrogen produced through reforming has a low CO content, the shift reactor of carbon monoxide 32 and the preferential oxidation reactor of carbon monoxide 33 are not required.

A fuel cell 34, which is a type of a polymer electrolyte fuel cell, includes a negative electrode 34A, a positive electrode 34B, and polymer electrolyte 34C provided between the electrodes. A hydrogen-rich gas produced through the above method is fed to the negative electrode, and air supplied by the air blower 35 is fed to the positive electrode. These two gases are appropriately humidified (humidifier not illustrated) in accordance with needs before introduction to the electrodes.

In operation, hydrogen gas releases electrons, thereby generating protons in the negative electrode, and oxygen gas forms water by capturing electrons and protons in the positive electrode, whereby direct current is generated between the electrodes 34A and 34B. In this case, the negative electrode is a platinum or Pt—Ru-alloy catalyst supporting platinum black or activated carbon, or a similar material, and the positive electrode is a platinum catalyst supporting platinum black or activated carbon, or a similar material.

An excessive amount of hydrogen serves as a fuel, when a burner 31A of the reformer 31 is connected to the negative electrode 34A. When a gas-water separator 36 is connected to the positive electrode 34B, water which has been formed through combination of hydrogen, and oxygen present in the air fed to the positive electrode 34B can be separated from the discharge gas. The thus-separated water can be utilized as a source of steam. Since the fuel cell 34 generates heat in the course of power generation, an exhaust heat recovery unit 37 is provided so as to recover and effectively utilize the heat. The exhaust heat recovery unit 37 includes a heat exchanger 37A attached to the fuel cell 34 for absorbing heat generated during reaction; a heat exchanger 37B for exchanging the heat absorbed by the heat exchanger 37A with water; a cooling unit 37C; and a pump 37D for circulating a cooling medium in the heat exchangers 37A and 37B and the cooling unit 37C. Warm water obtained in the heat exchanger 37B may be effectively utilized in other facilities.

EXAMPLES

The present invention will next be described in more detail by way of examples, which should not be construed as limiting the invention thereto.

(1) Compressive strength of each catalyst sample was determined by means of a Kiya-type strength meter (in accordance with ASTM D4179).

(2) Catalytic activity was obtained from C1 percent conversion (i.e., percent conversion to C1 species) (%) determined through the following procedure.

Each catalyst sample was pulverized to a particle size of 0.5 to 1 mm. The catalyst powder (1.5 mL) and SiC (3.5 mL) were charged into a reformer. The catalyst in the reformer was reduced with hydrogen in a hydrogen flow at 600° C. for one hour. Subsequently, steam reforming reaction was performed in the presence of the catalyst (accelerated deterioration test). Commercial kerosene (JIS No. 1) desulfurized to have a sulfur content of 0.01 ppm or less was used as a hydrocarbon feedstock. The feedstock (kerosene) and steam were introduced to the reformer at an LHSV of 4.6 hr$^{-1}$ and a steam/carbon (mole ratio) of 1.5 and at atmospheric pressure and a reaction temperature (center of the catalyst layer) of 600° C. After five hours from initiation of reforming, the gas obtained was sampled and analyzed through gas chromatography in terms of component and concentration. From the analytical data, C1 percent conversion was calculated by the following equation:

$$C1 \text{ percent conversion } (\%) = (A/B) \times 100$$

(wherein A is a sum of flow rate of CO (mol)+flow rate of $CO_2$ (mol)+flow rate of $CH_4$ (mol) (flow rate at the reactor outlet) and B represents flow rate of kerosene (mol, as reduced to carbon) at the reactor inlet).

(3) Steam Treatment Test (1)

Each catalyst sample was pulverized to a particle size of 0.5 to 1 mm. The catalyst powder (5 mL) was charged into a micro-reactor (inner diameter: 20 mm). To the reactor filled with the catalyst, $H_2$ (200 NmL/min) and $H_2O$ (0.132 g/min) were fed so as to perform steam treatment of the catalyst at 800° C. for five hours.

(3) Steam Treatment Test (2)

Each catalyst sample was pulverized to a particle size of 0.5 to 1 mm. The catalyst powder (5 mL) was charged into a micro-reactor. To the reactor filled with the catalyst, $H_2$ (200 NmL/min) and $H_2O$ (1.019 g/min) were fed so as to perform steam treatment of the catalyst at 850° C. for 96 hours.

(4) Evaluation of Heat Resistance

Each catalyst sample was calcined in a muffle furnace at 950° C. for 12 hours. Surface area and compressive strength of each sample before and after calcining were determined, whereby heat resistance of the sample was evaluated.

The surface area of each catalyst sample was determined through the surface area measurement (nitrogen adsorption) BET one-point method.

Example 1

Preparation of 3Ru/6MnO$_2$(A)/5La$_2$O$_3$/KHO-24 (Catalyst 1), Wherein (A) Indicates that the Component is Formed from a Corresponding Acetate Salt (i) Lanthanum nitrate (La(NO$_3$)$_3$.6H$_2$O, product of Wako Pure Chemical Industries, Ltd.) (2.82 g) was dissolved in water (7.1 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 5 mass % lanthanum oxide.

(iii) Manganese acetate (Mn(CH$_3$COO)$_2$.4H$_2$O, product of Wako Pure Chemical Industries, Ltd.) (3.64 g) was dissolved in water (6.2 mL), and the alumina carrier containing lanthanum oxide obtained in (ii) above (20 g) was impregnated with the solution.

(iv) Subsequently, the impregnation product was dried by means of a dryer at 120° C. for three hours, followed by calcining in a muffle furnace at 800° C. for three hours, to thereby prepare an alumina carrier containing 6 mass % manganese oxide and 5 mass % lanthanum oxide.

(v) Ruthenium chloride (RuCl$_3$, product of Tanaka Kikinzoku Kogyo K.K.; Ru content: 39.9 mass %) (1.55 g) was dissolved in water (7.8 mL), and the carrier prepared in (iv) above was impregnated with ruthenium chloride by use of the solution.

(vi) After completion of impregnation, the carrier was left to stand for about 30 minutes and dried, to thereby produce a crude catalyst.

(vii) The crude catalyst obtained in (vi) above was immersed in a 5 mol/L sodium hydroxide solution (25 mL) for one hour so as to carry out impregnation, whereby the above compounds were decomposed.

(viii) Subsequently, the thus-treated catalyst was sufficiently washed with distilled water and dried by means of a dryer at 120° C. for three hours, whereby catalyst 1 was prepared.

The thus-prepared catalyst was found to have a Ru content of 3.0 mass %.

Example 2

Preparation of 3Ru/5La$_2$O$_3$/6MnO$_2$(A)/KHO-24 (Catalyst 2), Wherein (A) Indicates that the Component is Formed from a Corresponding Acetate Salt (i) Manganese acetate (Mn(CH$_3$COO)$_2$.4H$_2$O, product of Wako Pure Chemical Industries, Ltd.) (3.64 g) was dissolved in water (7.5 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 800° C. for three hours, to thereby prepare an alumina carrier containing 6 mass % manganese oxide.

(iii) Lanthanum nitrate (La(NO$_3$)$_3$.6H$_2$O, product of Wako Pure Chemical Industries, Ltd.) (2.82 g) was dissolved in water (6.2 mL), and the alumina carrier containing manganese oxide obtained in (ii) above (20 g) was impregnated with the solution.

(iv) Subsequently, the impregnation product was dried by means of a dryer at 120° C. for three hours, followed by calcining in a muffle furnace at 800° C. for three hours, to thereby prepare an alumina carrier containing 6 mass % manganese oxide and 5 mass % lanthanum oxide.

(v) Subsequently, the same procedure as employed in (v) to (viii) of Example 1 (preparation of catalyst 1) was repeated, whereby catalyst 2 was prepared.

Example 3

Preparation of $3Ru/6MnO_2(A)+5La_2O_3/KHO-24$ (Catalyst 3), Wherein (A) Indicates that the Component is Formed from a Corresponding Acetate Salt (i) Manganese acetate ($Mn(CH_3COO)_2 \cdot 4H_2O$, product of Wako Pure Chemical Industries, Ltd.) (3.64 g) and lanthanum nitrate ($La(NO_3)_3 \cdot 6H_2O$, product of Wako Pure Chemical Industries, Ltd.) (2.82 g) were simultaneously dissolved in water (6.3 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 800° C. for three hours, to thereby prepare an alumina carrier containing 6 mass % manganese oxide and 5 mass % lanthanum oxide.

(iii) Subsequently, the same procedure as employed in (v) to (viii) of Example 1 (preparation of catalyst 1) was repeated, whereby catalyst 3 was prepared.

Example 4

Preparation of $3Ru/6MnO_2(A)/5La_2O_3/KHO-24$ (Catalyst 4), Wherein (A) Indicates that the Component is Formed from a Corresponding Acetate Salt (i) Lanthanum nitrate ($La(NO_3)_3 \cdot 6H_2O$, product of Wako Pure Chemical Industries, Ltd.) (2.82 g) was dissolved in water (7.1 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 5 mass % lanthanum oxide.

(iii) Manganese acetate ($Mn(CH_3COO)_2 \cdot 4H_2O$, product of Wako Pure Chemical Industries, Ltd.) (3.64 g) was dissolved in water (6.2 mL), and the alumina carrier containing lanthanum oxide obtained in (ii) above (20 g) was impregnated with the solution.

(iv) Subsequently, the impregnation product was dried by means of a dryer at 120° C. for three hours, followed by calcining in a muffle furnace at 950° C. for three hours, to thereby prepare an alumina carrier containing 6 mass % manganese oxide and 5 mass % lanthanum oxide.

(v) Subsequently, the same procedure as employed in (v) to (viii) of Example 1 (preparation of catalyst 1) was repeated, whereby catalyst 4 was prepared.

Example 5

Preparation of $3Ru/10MnO_2(N)/5La_2O_3/KHO-24$ (Catalyst 5), Wherein (N) Indicates that the Component is Formed from a Corresponding Nitrate Salt (i) Lanthanum nitrate ($La(NO_3)_3 \cdot 6H_2O$, product of Wako Pure Chemical Industries, Ltd.) (2.82 g) was dissolved in water (7.1 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 5 mass % lanthanum oxide.

(iii) Manganese nitrate ($Mn(NO_3)_2 \cdot 6H_2O$, product of Wako Pure Chemical Industries, Ltd.) (7.41 g) was dissolved in water (6.2 mL), and the alumina carrier containing lanthanum oxide obtained in (ii) above (20 g) was impregnated with the solution.

(iv) Subsequently, the impregnation product was dried by means of a dryer at 120° C. for three hours, followed by calcining in a muffle furnace at 950° C. for three hours, to thereby prepare an alumina carrier containing 10 mass % manganese oxide and 5 mass % lanthanum oxide.

(v) Subsequently, the same procedure as employed in (v) to (viii) of Example 1 (preparation of catalyst 1) was repeated, whereby catalyst 5 was prepared.

The thus-prepared catalyst was found to have an Ru content of 3.0 mass %.

Example 6

Preparation of $3Ru/6MnO_2(A)/5CeO_2/KHO-24$ (Catalyst 6), Wherein (A) Indicates that the Component is Formed from a Corresponding Acetate Salt (i) Cerium nitrate ($Ce(NO_3)_3 \cdot 6H_2O$, product of Wako Pure Chemical Industries, Ltd.) (2.71 g) was dissolved in water (7.1 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 5 mass % cerium oxide.

(iii) Manganese acetate ($Mn(CH_3COO)_2 \cdot 4H_2O$, product of Wako Pure Chemical Industries, Ltd.) (3.64 g) was dissolved in water (6.2 mL), and the alumina carrier containing cerium oxide obtained in (ii) above (20 g) was impregnated with the solution.

(iv) Subsequently, the impregnation product was dried by means of a dryer at 120° C. for three hours, followed by calcining in a muffle furnace at 800° C. for three hours, to thereby prepare an alumina carrier containing 6 mass % manganese oxide and 5 mass % cerium oxide.

(v) Subsequently, the same procedure as employed in (v) to (viii) of Example 1 (preparation of catalyst 1) was repeated, whereby catalyst 6 was prepared.

The thus-prepared catalyst was found to have an Ru content of 3.0 mass %.

Example 7

Preparation of 3Ru/6MnO$_2$(A)/5ZrO$_2$/KHO-24 (Catalyst 7), Wherein (A) Indicates that the Component is Formed from a Corresponding Acetate Salt (i) Zirconium nitrate (Zr(NO$_3$)$_2$·2H$_2$O, product of Wako Pure Chemical Industries, Ltd.) (2.33 g) was dissolved in water (6.9 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 5 mass % zirconium oxide.

(iii) Manganese acetate (Mn(CH$_3$COO)$_2$·4H$_2$O, product of Wako Pure Chemical Industries, Ltd.) (3.64 g) was dissolved in water (6.2 mL), and the alumina carrier containing zirconium oxide prepared in (ii) above (20 g) was impregnated with the solution.

(iv) Subsequently, the impregnation product was dried by means of a dryer at 120° C. for three hours, followed by calcining in a muffle furnace at 800° C. for three hours, to thereby prepare an alumina carrier containing 6 mass % manganese oxide and 5 mass % zirconium oxide.

(v) Subsequently, the same procedure as employed in (v) to (viii) of Example 1 (preparation of catalyst 1) was repeated, whereby catalyst 7 was prepared.

The thus-prepared catalyst was found to have a Ru content of 3.0 mass %.

Comparative Example 1

Preparation of 3Ru-6MnO$_2$/KHO-24 (Catalyst 8)

(i) Manganese acetate (Mn(CH$_3$COO)$_2$·4H$_2$O, product of Wako Pure Chemical Industries, Ltd.) (3.64 g) was dissolved in water (7.5 mL), and γ-alumina (KHO-24, product of Sumitomo Chemical Co., Ltd.) (20 g) was impregnated with the solution.

(ii) Subsequently, the impregnation product was dried by means of a dryer at 120° C. for three hours, followed by calcining in a muffle furnace at 500° C. for three hours, to thereby prepare an alumina carrier containing 6 mass % manganese oxide.

(iii) Ruthenium chloride (RuCl$_3$, product of Tanaka Kikinzoku kogyo K.K.; Ru content: 39.9 mass %) (1.55 g) was dissolved in water (7.8 mL), and the carrier prepared in (ii) above was impregnated with ruthenium chloride by use of the solution. Subsequently, the carrier was dried by means of a dryer at 80° C. for three hours.

(iv) The thus-dried carrier was immersed in a 5 mol/L sodium hydroxide solution (25 mL) for one hour so as to carry out impregnation, whereby the above compounds were decomposed.

(v) Subsequently, the thus-treated catalyst was sufficiently washed with distilled water and dried by means of a dryer at 120° C. for three hours, whereby catalyst 8 was prepared.

The thus-prepared catalyst was found to have a Ru content of 3.0 mass %.

Test Example 1

Each of the catalysts produced in Examples 1 to 7 and Comparative Example 1 was evaluated. Specifically, percent conversion to C1 species (C1 percent conversion) was determined so as to evaluate catalytic activity and the catalyst was subjected to steam treatment tests (1) and (2). After completion of each steam treatment test, mechanical strength of the catalyst was measured, and C1 percent conversion was determined under the same conditions so as to evaluate catalytic activity. The results are shown in Table 1.

TABLE 1

| | | La (mass %) | Mn (mass %) | Calcining-temp. (° C.) | Activity (%) | Catalyst compressive strength (kg) | Catalyst CO adsorption (μmol/g) | Compressive strength (kg) after steam treatment (1) | Activity (%) after steam treatment (1) | Compressive strength (kg) after steam treatment (2) | Activity (%) after steam treatment (2) |
|---|---|---|---|---|---|---|---|---|---|---|---|
| Ex. 1 | Catalyst 1 | 5 | from acetate (6) | 800 | 78.2 | 18 | 67.1 | 15 | 68.3 | 10 | 26.7 |
| Ex. 2 | Catalyst 2 | 5 | from acetate (6) | 800 | 73.4 | 19 | 72.9 | 15 | 66.2 | 10 | 24.3 |
| Ex. 3 | Catalyst 3 | 5 | from acetate (6) | 800 | 73.7 | 23 | 72.4 | 15.5 | 68.2 | 10 | 22.7 |
| Ex. 4 | Catalyst 4 | 5 | from acetate (6) | 950 | 71.1 | 16 | 76.6 | 15 | 65.3 | 5 | 18.5 |
| Ex. 5 | Catalyst 5 | 5 | from acetate (10) | 950 | 71.6 | 14 | 65.7 | 13 | 65.2 | 4 | 18.2 |
| Ex. 6 | Catalyst 6 | Ce 5 | from acetate (6) | 800 | 71.5 | 18 | 65.0 | 15 | 61.6 | 7 | 18.4 |
| Ex. 7 | Catalyst 7 | Zr 5 | from acetate (6) | 800 | 66.3 | 18 | 62.0 | 15 | 58.3 | 7 | 18.3 |
| Comp. Ex. 1 | Catalyst 8 | — | from acetate (6) | 800 | 61.5 | 17 | 56.2 | 14 | 55.1 | 2.5 | 11.8 |

Comparative Example 2

Preparation of 3Ru/KHO-24 (Catalyst 9)

(i) Ruthenium chloride ($RuCl_3$, product of Tanaka Kikinzoku kogyo k. k.; Ru content: 39.9 mass %) (1.55 g) was dissolved in water (7.8 mL), and γ-alumina (KHO-24, commercial product of Sumitomo Chemical Co., Ltd.) was impregnated with the aqueous ruthenium chloride solution. After completion of impregnation, the carrier was left to stand for about 30 minutes, to thereby produce a crude catalyst. The thus-obtained crude catalyst was immersed in a 5 mol/L sodium hydroxide solution (25 mL) for one hour so as to carry out impregnation, whereby the Ru compound was decomposed. Subsequently, the thus-treated catalyst was sufficiently washed with distilled water and dried by means of a dryer at 120° C. for three hours, whereby catalyst 9 was prepared.

Example 8

Preparation of 3Ru/6MnO$_2$(A)/3SiO$_2$/KHO-24 (Catalyst 10), Wherein (A) Indicates that the Component is Formed from a Corresponding Acetate Salt (i) Tetraethoxysilane ($Si(OC_2H_5)_4$, product of Shin-Etsu Chemical Co., Ltd.) (4.60 g) was dissolved in ethanol (100 mL), and γ-alumina (KHO-24, product of Sumitomo Chemical Co., Ltd.) (20 g) was immersed in the solution. The mixture was allowed to react at 60° C. for one hour under stirring. After completion of reaction, ethanol was removed by means of a rotary evaporator, and the reaction mixture was dried overnight by means of a dryer at 120° C. The dried product was calcined in a muffle furnace at 800° C. for three hours, to thereby prepare an alumina carrier containing 3 mass % silicon oxide (3SiO$_2$/KHO-24). Subsequently, manganese acetate ($Mn(CH_3COO)_2 \cdot 4H_2O$, product of Wako Pure Chemical Industries, Ltd.) (3.64 g) was dissolved in water (7.5 mL), and the above alumina carrier containing 3 mass % silicon oxide (3SiO$_2$/KHO-24) was impregnated with the solution. The impregnation product was calcined in a muffle furnace at 800° C. for three hours, to thereby prepare an alumina carrier containing manganese oxide and silicon oxide (6MnO$_2$(A)/3SiO$_2$/KHO-24).

(ii) Ruthenium chloride ($RuCl_3$, product of Tanaka Kikinzoku Kogyo K.K.; Ru content: 39.9 mass %) (1.55 g) was dissolved in water (7.8 mL), and the alumina carrier containing manganese oxide and silicon oxide prepared above was impregnated with the aqueous ruthenium chloride solution. After completion of impregnation, the carrier was left to stand for about 30 minutes for drying, to thereby produce a crude catalyst. The crude catalyst obtained above was immersed in a 5 mol/L sodium hydroxide solution (25 mL) for one hour so as to carry out impregnation, whereby the above compounds were decomposed. Subsequently, the thus-treated catalyst was sufficiently washed with distilled water and dried by means of a dryer at 120° C. for three hours, whereby catalyst 10 was prepared.

The thus-prepared catalyst was found to have a Ru content of 3.0 mass %.

Example 9

Preparation of 3Ru/3SiO$_2$/6MnO$_2$(A)/KHO-24 (Catalyst 11), Wherein (A) Indicates that the Component is Formed from a Corresponding Acetate Salt (i) Manganese acetate ($Mn(CH_3COO)_2 \cdot 4H_2O$, product of Wako Pure Chemical Industries, Ltd.) (3.64 g) was dissolved in water (7.5 mL), and alumina was impregnated with the solution. Subsequently, the impregnation product was dried by means of a dryer at 120° C. for three hours, followed by calcining in a muffle furnace at 800° C. for three hours, to thereby prepare an alumina carrier containing manganese oxide (6MnO$_2$/KHO-24) Tetraethoxysilane ($Si(OC_2H_5)_4$, product of Shin-Etsu Chemical Co., Ltd.) (4.60 g) was dissolved in ethanol (100 mL), and the above-prepared alumina carrier containing manganese oxide (20 g) was immersed in the solution. The mixture was allowed to react at 60° C. for one hour under stirring. After completion of reaction, ethanol was removed by means of a rotary evaporator, and the reaction mixture was dried overnight by means of a dryer at 120° C. The dried product was calcined in a muffle furnace at 800° C. for three hours, to thereby prepare an alumina carrier containing 3 mass % silicon oxide and manganese oxide (3SiO$_2$/6MnO$_2$/KHO-24).

(ii) The same procedure as employed in (ii) of Example 8 was repeated, except that the above-produced alumina carrier containing 3 mass % silicon oxide and manganese oxide (3SiO$_2$/6MnO$_2$(A)/KHO-24) was employed, whereby catalyst 11 was prepared.

The thus-prepared catalyst was found to have a Ru content of 3.0 mass %.

Comparative Example 3

Preparation of 3Ru/5La$_2$O$_3$(N)/KHO-24 (Catalyst 12), Wherein (N) Indicates that the Component is Formed from a Corresponding Nitrate Salt (i) Lanthanum nitrate ($La(NO_3)_3 \cdot 6H_2O$, product of Wako Pure Chemical Industries, Ltd.) (2.82 g) was dissolved in water (7.1 mL), and γ-alumina (KHO-24, product of Sumitomo Chemical Co., Ltd.) (20 g) was impregnated with the solution. Subsequently, the impregnation product was dried by means of a dryer at 120° C. for three hours, followed by calcining in a muffle furnace at 800° C. for three hours, to thereby prepare an alumina carrier containing 5 mass % lanthanum oxide.

(ii) The same procedure as employed in (ii) of Example 8 was repeated, except that the above-produced alumina carrier containing 5 mass % lanthanum oxide was employed, whereby catalyst 12 was prepared.

Test Example 2

Each of the catalysts produced in Examples 8 and 9 and Comparative Examples 2 and 3 was evaluated in terms of heat resistance. The results are shown in Table 2.

TABLE 2

| | Catalyst | Before calcining at 950° C. | | After calcining at 950° C. | |
|---|---|---|---|---|---|
| | | Surface area (m$^2$/g) | Compressive strength (kg) | Surface area (m$^2$/g) | Compressive strength (kg) |
| Comp. Ex. 2 | Catalyst 9 | 149 | 18 | 70 | 13 |
| Ex. 8 | Catalyst 10 | 117 | 14 | 100 | 18 |
| Ex. 9 | Catalyst 11 | 119 | 15 | 104 | 18 |
| Comp. Ex. 3 | Catalyst 12 | 120 | 19 | 88 | 17 |

INDUSTRIAL APPLICABILITY

According to the present invention, there can be provided a hydrocarbon reforming catalyst which maintains carrier strength (particularly, compressive strength of the carrier)

even after a long-term thermal history, which exhibits high catalytic activity, and which maintains the catalytic activity even after a long-term thermal history; a hydrocarbon reforming catalyst which exhibits enhanced heat resistance; and a method for producing hydrogen by use of any of the reforming catalysts. The invention can also provide an advanced fuel cell system comprising a reformer employing such an excellent reforming catalyst, and a fuel cell employing, as a fuel, hydrogen produced by the reformer.

The invention claimed is:

1. A hydrocarbon reforming catalyst, comprising:
a carrier consisting of (a), (b), and (c); wherein (a) is at least one compound selected from the group consisting of lanthanum oxide, cerium oxide, and zirconium oxide; (b) is manganese oxide; (c) is alumina; and (d), supported on the carrier, at least one noble metal component selected from the group consisting of a ruthenium component, a platinum component, a rhodium component, a palladium component, and an iridium component;
wherein component (a) of the carrier is present in an amount of 1 to 20 mass % with respect to the amount of the reforming catalyst;
wherein the noble metal component is present in an amount of 0.1 to 8 mass % as reduced to the noble metal element based on the amount of the reforming catalyst; and
wherein the carrier is produced by impregnating alumina with at least one compound selected from the group consisting of a lanthanum compound, a cerium compound, and a zirconium compound; calcining the impregnated alumina carrier at 400 to 600° C.; impregnating the calcined alumina carrier with a manganese compound; and calcining the manganese impregnated calcined alumina carrier at 800 to 1,000° C.

2. The hydrocarbon reforming catalyst as described in claim 1, wherein the manganese compound is manganese acetate.

3. The hydrocarbon reforming catalyst as described in claim 1, wherein the manganese oxide is contained in the reforming catalyst in an amount of 3 to 20 mass %.

4. The hydrocarbon reforming catalyst as described in claim 1, which further contains at least one species selected from the group consisting of an alkali metal component and an alkaline earth metal component.

5. A method for producing hydrogen comprising reforming a hydrocarbon by contacting the hydrocarbon with the reforming catalyst as recited in claim 1.

6. The method for producing hydrogen as described in claim 5, wherein the reforming is steam reforming, autothermal reforming, partial-oxidation reforming, or carbon dioxide reforming.

7. A fuel cell system comprising a reformer employing a reforming catalyst as recited in claim 1, and a fuel cell employing, as a fuel, hydrogen produced by said reformer.

8. A hydrocarbon reforming catalyst, consisting of components (a), (b), (c) and (d): wherein (a), (b), and (c) are components of a carrier
(a) is at least one compound selected from the group consisting of lanthanum oxide, cerium oxide, and zirconium oxide,
(b) is manganese oxide,
(c) is alumina, and
(d), supported on the carrier, at least one noble metal component selected from the group consisting of a ruthenium component, a platinum component, a rhodium component, a palladium component, and an iridium component;
wherein component (a) of the carrier is present in an amount of 1 to 20 mass % with respect to the amount of the reforming catalyst; and
wherein the noble metal component is present in an amount of 0.1 to 8 mass % as reduced to the noble metal element based on the amount of the reforming catalyst.

9. A hydrocarbon reforming catalyst, comprising:
a carrier consisting of (a) lanthanum oxide, (b) manganese oxide, and (c) alumina, and
(d), supported on the carrier, at least one noble metal component selected from the group consisting of a ruthenium component, a platinum component, a rhodium component, a palladium component, and an iridium component;
wherein component (a) of the carrier is present in an amount of 1 to 20 mass % with respect to the amount of the reforming catalyst; and
wherein the noble metal component is present in an amount of 0.1 to 8 mass % as reduced to the noble metal element based on the amount of the reforming catalyst.

* * * * *